(12) United States Patent
Lee et al.

(10) Patent No.: US 6,527,446 B2
(45) Date of Patent: Mar. 4, 2003

(54) FOIL JOURNAL BEARING UTILIZING SEMI-ACTIVE DAMPERS

(76) Inventors: Yong Bok Lee, Ssangyong Apartment 101-1304, Chang-dong, Dobong-gu, Seoul (KR), 132-040; Chang Ho Kim, Yaksoo Apartment 116-1808, Shindang-dong 842, Jung-gu, Seoul (KR), 100-450; Nam Soo Lee, 340-273, Seokgwan-dong, Seongpuk-gu, Seoul (KR), 136-150; Tae Ho Kim, 351-12, Kimryangjang-dong, Yongin, Kyunggi-do (KR), 449-926

( * ) Notice: Subject to any disclaimer, the term of this patent is extended or adjusted under 35 U.S.C. 154(b) by 0 days.

(21) Appl. No.: 09/915,051

(22) Filed: Jul. 25, 2001

(65) Prior Publication Data

US 2002/0097930 A1 Jul. 25, 2002

(30) Foreign Application Priority Data

Jan. 19, 2001 (KR) .......................................... 2001-3305

(51) Int. Cl.⁷ .............................................. F16C 17/06
(52) U.S. Cl. ........................................ 384/99; 384/106
(58) Field of Search ........................ 384/106, 99, 105, 384/103

(56) References Cited

U.S. PATENT DOCUMENTS

| | | | |
|---|---|---|---|
| 4,178,046 A | 12/1979 | Silver | 384/103 |
| 4,195,395 A | 4/1980 | Silver | 29/898.02 |
| 4,227,752 A | * 10/1980 | Wilcock | 384/106 |
| 4,475,824 A | 10/1984 | Glaser | 384/306 |
| 4,526,483 A | 7/1985 | Hishikawa | 384/106 |
| 4,552,466 A | 11/1985 | Warren | 384/103 |
| 4,616,388 A | 10/1986 | Soum | 29/898.02 |
| 4,950,089 A | 8/1990 | Jones | 384/103 |
| 5,911,511 A | * 6/1999 | Saville | 384/106 |

* cited by examiner

*Primary Examiner*—Lenard A. Footland

(57) ABSTRACT

A foil journal bearing which is provided at an interior surface of the bearing housing with a plurality of foils or one foil for supporting a shaft comprises a plurality of dampers embedded in an inside portion of its bearing housing while coming into contact with and supporting the plurality of foils or the one foil to increase stiffness and damping capacity of the bearing during rotation of said shaft, wherein each of said dampers is comprised of a damper pin inserted into one of dimples formed on the interior surface of the bearing housing and an elastic spring interposed between a bottom of the damper pin and a bottom of the dimple.

7 Claims, 4 Drawing Sheets

FOIL JOURNAL BEARING UTILIZING SEMI-ACTIVE DAMPERS

BACKGROUND OF THE INVENTION

1. Field of the Invention

The present invention relates to foil journal bearings, and more particularly to a foil journal bearing utilizing semi-active dampers which improves the stiffness of the bearing against rotational shaft-supported load and the vibration suppressing capability of the bearing.

2. Description of the Prior Art

In general, a foil journal bearing employs air as lubricating material instead of lubricating oil, and therefore it is generally suitable for a clean mechanical system. Such a foil journal bearing has a relatively wide area for supporting a rotating member in comparison with other bearings, thus having high reliability. Accordingly, the foil journal bearing can be utilized as a supporting bearing for small, general aerial gas turbine engines, turbo expanders, various aerospace auxiliary power units, land transportation means, vapor cycle centrifugal compressors, and various commercial air compressors.

The foil journal bearing should be designed to have load-carrying capacity and stability, and withstand wear due to unstable contact between a shaft and a bearing during its starting and stopping.

FIG. 1 shows a sectional view of a conventional multi-leaf type foil journal bearing. A plurality of axial grooves 12a are formed on the inner surface of a bearing housing 12 while being spaced apart from one another. A plurality of the multi-leaf foils 14 are arranged into the axial grooves 12a, and support a shaft 10. The conventional multi-leaf foil journal bearing shown as FIG. 1 can increase stiffness as being increased the thickness of the multi-leaf foil 14. However, the conventional multi-leaf type foil journal bearing is problematic in that the thickness of the foil is restricted and the life span of the bearing is restricted due to wear between the shaft 10 and the foils 14. The vibration of the shaft 10 is controlled by only a factor of the multi-leaf foil 14, for example, the thickness or the number of the foils, so that it is difficult to control the vibration of the shaft 10.

FIG. 2 illustrates a sectional view of a bump foil journal bearing in which a top foil 16 and a bump foil 18 are positioned on the inner surface of a bearing housing 12 and support a shaft 10 thereon. The bump foil journal bearing can increase load-carrying capacity by the great stiffness of the bump foil 18. However, gas in the bump foil 18 leaks in its axial direction, thereby being reduced the damping capacity of the bump bearing. In addition, the conventional bump foil journal bearing is further problematic in that it is difficult to design and form the bump foil 18.

SUMMARY OF THE INVENTION

The main object of the present invention is to provide a foil journal bearing utilizing semi-active dampers, which improves load-carrying capacity and stability to be high by increasing stiffness and damping capacity.

Another object of the present invention is to provide a semi-active damper foil journal bearing which reduces the damping vibration and instability of the bearing by gas in a space between damper pin and a dimple of the bearing housing and/or which increase the stiffness by the spring under the damper pin when a shaft rotates fast.

In order to accomplish the above object, the present invention provides a foil journal bearing which is provided at an interior surface of the bearing housing with a plurality of foils or one foil for supporting a shaft wherein the bearing comprising a plurality of dampers embedded in an inside portion of its bearing housing while coming into contact with and supporting the plurality of foils or the one foil to increase stiffness and damping capacity of the bearing during rotation of said shaft, wherein each of said dampers is comprised of a damper pin inserted into one of dimples formed on the interior surface of the bearing housing and an elastic spring interposed between a bottom of the damper pin and a bottom of the dimple.

In order to accomplish the above object, the present invention provides a foil journal bearing for supporting a shaft, wherein the bearing comprising a plurality of foils or one foil at an interior surface of the foil journal bearing housing, and a plurality of dampers embedded in the interior surface of the foil journal bearing housing while coming into contact with and supporting the foils or the one foil to increase stiffness and damping capacity of the bearing during rotation of said shaft.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
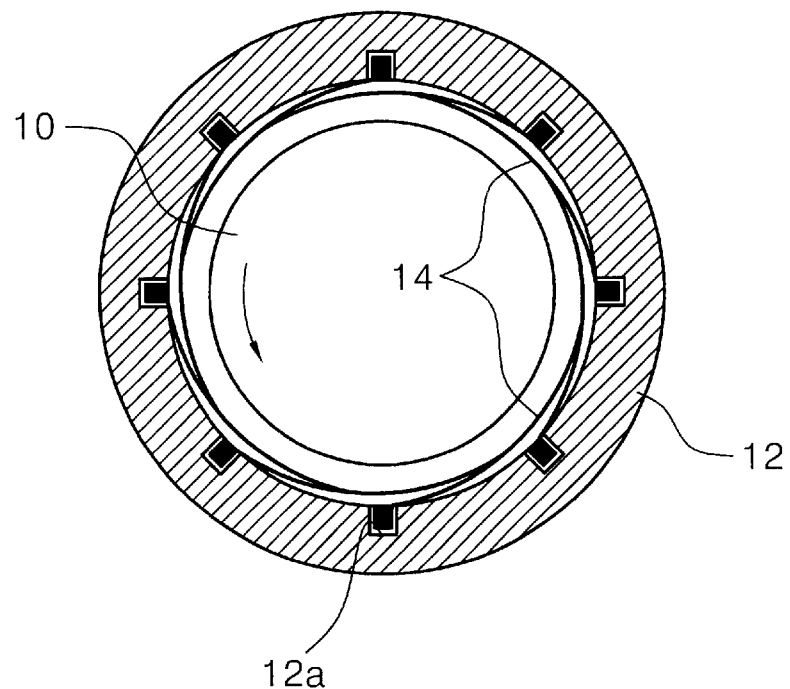
FIG. 1 is a sectional view of a conventional multi-leaf foil journal bearing.
Figure 2:
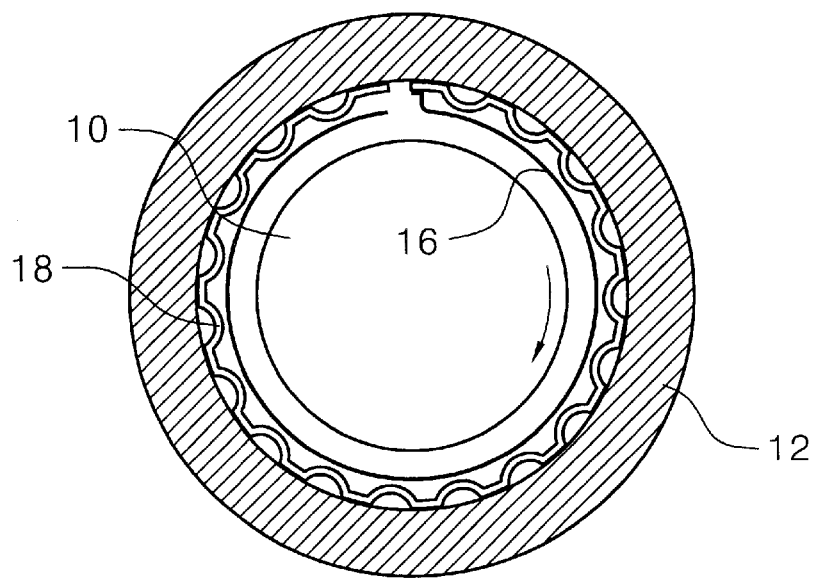
FIG. 2 is a sectional view of a conventional bump foil journal bearing.

With referring to the drawings, the preferred embodiments in accordance with the present invention will be explained as followings:

As shown in Figures, the reference numerals of the embodiments of the present invention are labeled as the same those of the conventional art of FIGS. 1 and 2 to designate the same or similar elements.

Figure 3B:
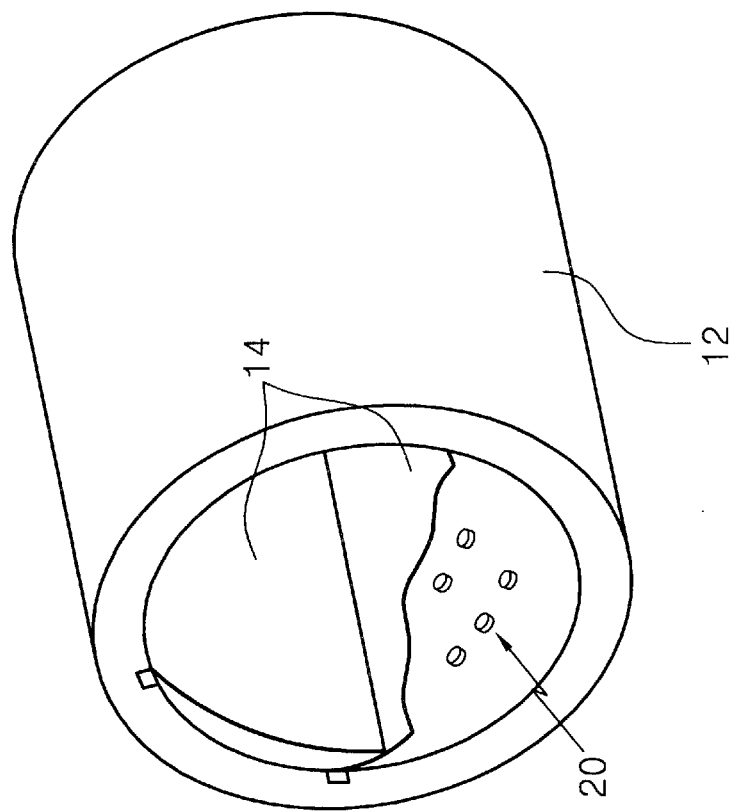
FIG. 3B is a perspective view of FIG. 3A.
Figure 3A:
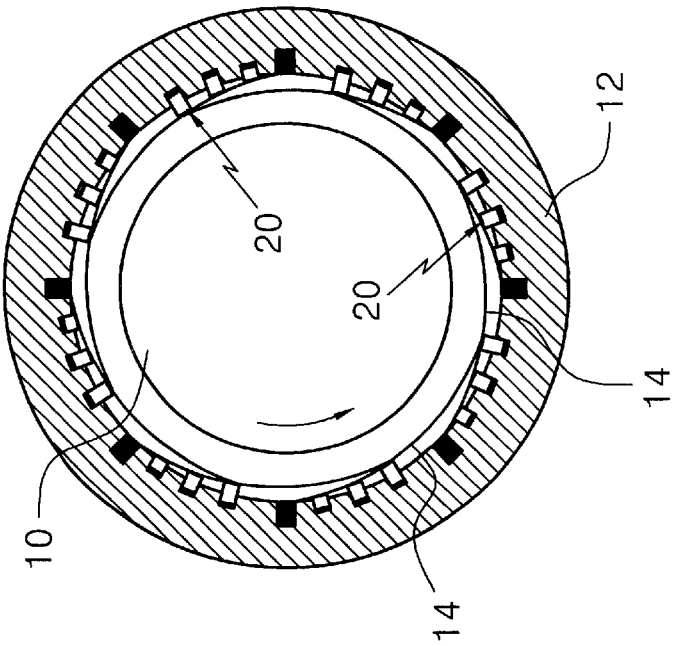
FIG. 3A is a sectional view of a foil journal bearing according to a first embodiment of the present invention.

FIGS. 3A is a sectional view of a foil journal bearing according to a first embodiment of the present invention and FIG. 3B is a perspective view of FIG. 3A.

In FIGS. 3A and 3B, there is shown an air foil journal bearing of the present invention in which a plurality of foils 14 are arranged on the inner surface of a bearing housing 12 and a plurality of dampers 20 are embedded in the inner portion of the bearing housing 12 against the foils 14.

Figure 4:
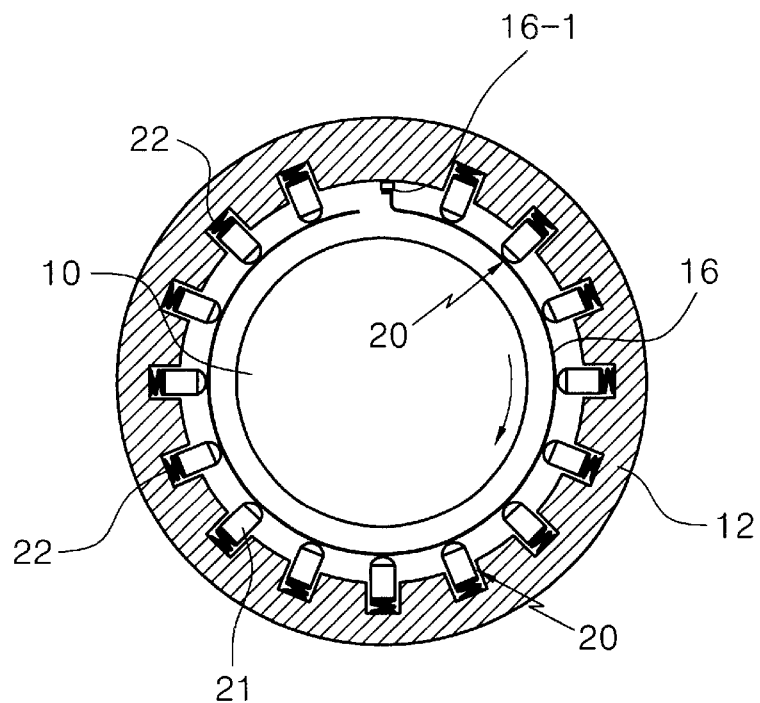
FIG. 4 is a sectional view of a foil journal bearing according to a second embodiment of the present invention.

FIG. 4 is a sectional view showing a foil journal bearing according to a second embodiment of the present invention.

In this foil journal bearing, the plurality of foils 14 of FIG. 3A and 3B are replaced by a top foil 16 which is fixed at a fixing part 16-1 inside portion of the bearing housing. Additionally, a plurality of dampers 20 are embedded in the inside portion of the bearing housing 12 while coming into contact with and supporting the top foil 16. Accordingly, the foil journal bearing of the present invention increases the radial load-carrying capacity and damping capacity of the bearing, so instability can be eliminated when the shaft 10 rotates fast.

Figure 5:
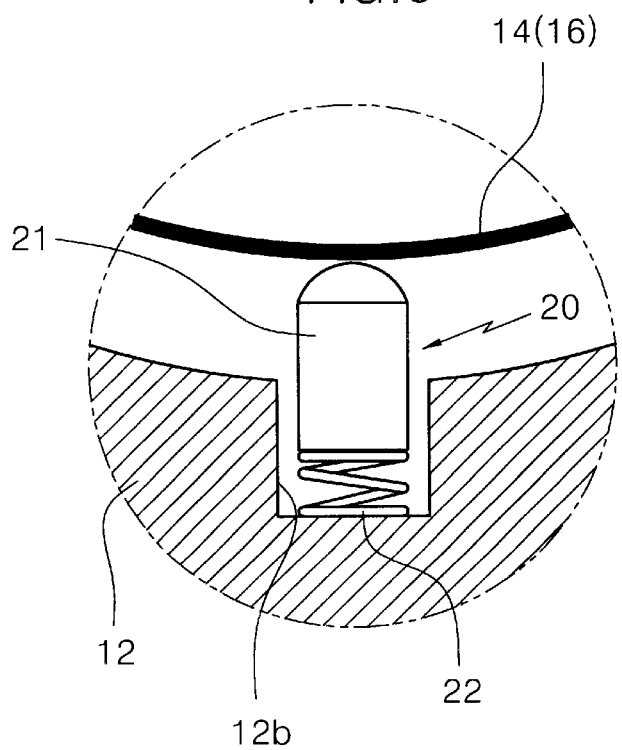
FIG. 5 is a detailed view showing a damper mounted in a dimple of the bearing housing of the foil journal bearing in accordance with the present invention.

FIG. 5 is a detailed view showing a damper 20 mounted in a dimple of the bearing housing of the foil journal bearing in accordance with the present invention.

Each of the dampers 20 is comprised of a damper pin 21 inserted into one of dimples 12b regularly formed on the inner surface of the bearing housing 12 and a spring 22 interposed between the bottom of the damper pin 21 and the bottom of the dimple 12b to connect them to each other.

The damper pin 21 is brought into contact at its upper surface with a foil 14 or 16 and at its lower surface with the spring 22. The damper pin 21 is positioned in the radial direction of the bearing housing 12, and inserted into the dimple 12b to be slidably moved in the dimple 22. Accordingly, when load acts upon the foils 14 or 16, the impact force of the load is absorbed by the elastic action of the spring 22. At the same time, the damping capacity of the foil bearing is increased by the pressure of air filling the space between the damper pin 21 and the dimple 12b and by the friction force caused by contact between the damper pin 21 and the dimple 12b. The damper pin 21 is slidably inserted into the dimple 12b, so that the radial vibration of the shaft is suppressed in such a way that the damper pin 21 compresses the spring 22, compresses the air filling the space between the damper pin 21 and the dimple 12b and forms an air flow between the damper pin 21 and the sidewall of the dimple 12b (which is called by a squeeze film phenomenon). Air flow can compensate for the lack of viscous damping capacity in the foil bearing of the present invention.

In these embodiments according to the present invention, the spring 22 is a coil spring made of a thin plate to adjust the height of the damper pin 21 according to the position of the corresponding portion of the foils 14 or 16. The spring 22 is preferably made of heat-resistant steel that has relatively low elastic and thermal deformation.

Figure 6:
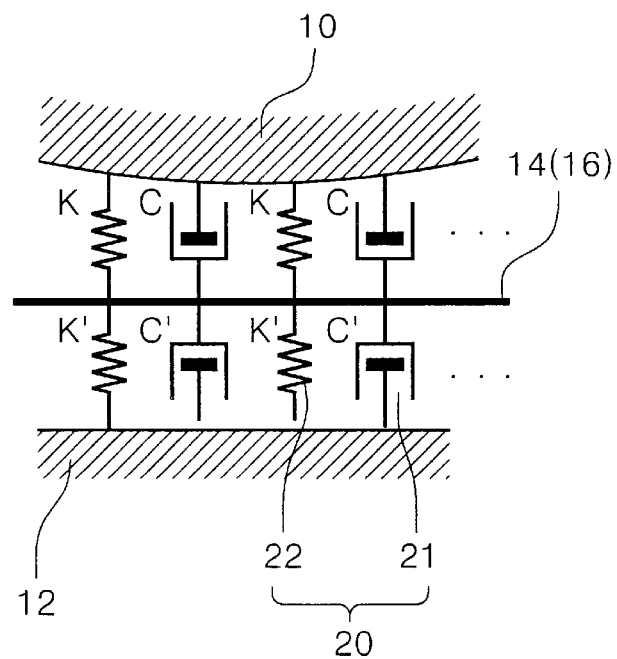
FIG. 6 is a schematic diagram showing the equivalent entire stiffness of the foil journal bearing in accordance with the present invention.

FIG. 6 is a schematic diagram showing the equivalent entire stiffness of the foil journal bearing in accordance with the present invention.

When a shaft 10 is rotated at a high speed, the damping capacity C' of the damper pin 21 and the stiffness K' of the spring 22 are added to the stiffness of the foils 14 or 16, thereby resulting in the total equivalent stiffness illustrated in FIG. 6. That is, while the shaft 10 is rotated, the foil journal bearing of the present invention has the foil stiffness K' and foil damping capacity C' of the foils 14 as well as the air stiffness K and the air damping capacity C of the film-shaped air flow.

On the other hand, in the foil journal bearing of the present invention, the total stiffness of the bearing can be adjusted by controlling the number of the dampers 20. Additionally, the total stiffness of the bearing can be adjusted by controlling the elastic constant of the springs 22. When the total stiffness of the bearing is adjusted to be increased, the load-carrying capacity of the foil journal bearing can be improved at load support positions during the rotation of the shaft 10.

Figure 7:
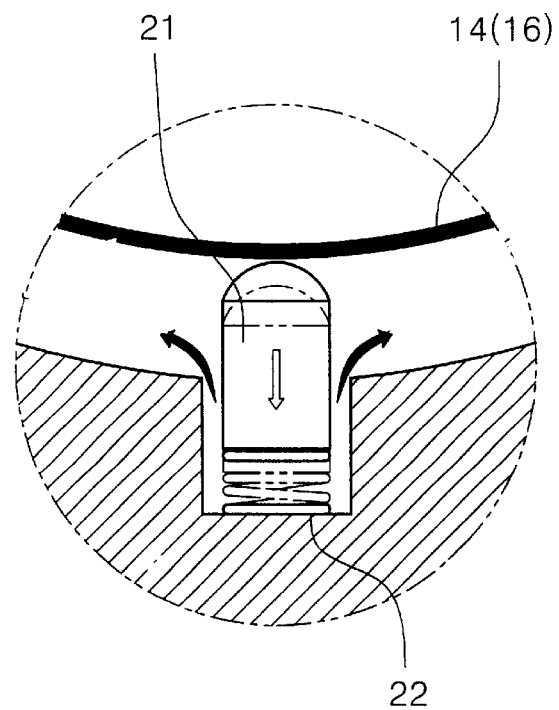
FIG. 7 is a view explaining a squeeze film and Coulomb friction phenomenon around a damper pin of this foil journal bearing.

According to the foil journal bearing of the present invention, the vibrations of the shaft 10 can be radially suppressed by a film-shaped air flow formed by a squeeze film phenomenon and formed in the direction indicated by the arrows of FIG. 7. This can increase damping capacity and improve the stability of the bearing when the shaft 10 is rotated at a speed greater than a critical speed.

As described above, the present invention provides a foil journal bearing, in which a plurality of dampers are embedded in the inside portion of the bearing housing while coming into contact with and supporting leaf type foils or a top foil that are arranged on the inside surface of the bearing, thereby increasing the radial load-carrying capacity and damping capacity of the bearing.

Additionally, according to the foil journal bearing of the present invention, a load-carrying capacity is further increased by the stiffness of elastic springs and the vibrations of bearings when the shaft is rotating fast can be suppressed by an air flow generated by a squeeze film phenomenon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A foil journal bearing which is provided at an interior surface of the bearing housing with a plurality of foils or one foil for supporting a shaft, the foil journal bearing comprising:
a plurality of dampers embedded in an inside portion of its bearing housing while coming into contact with and supporting the plurality of foils or the one foil to increase stiffness and damping capacity of the bearing during rotation of said shaft, wherein each of said dampers is comprised of a damper pin inserted into one of dimples formed on the interior surface of the bearing housing and an elastic spring interposed between a bottom of the damper pin and a bottom of the dimple.

2. The foil journal bearing according to claim 1, wherein said elastic spring is a coil spring made of a thin plate so as to adjust a height of the damper pin according to a position of a corresponding portion of said foils or said one foil.

3. The foil journal bearing according to claim 1, wherein said stiffness and damping capacity depend on the number of said dampers and an elastic constant of said elastic springs.

4. The foil journal bearing according to claim 1, wherein said the dampers are slidably and movably installed in the dimples with a small gap between an outer surface of said damper pin and a sidewall of said dimple so as to create a radial air flow to outside of the dampers from the spaces between the bottoms of the damper pins and the dimples.

5. The foil journal bearing according to claim 4, wherein said stiffness and damping capacity depend on the number of said dampers and an elastic constant of said elastic springs.

6. The foil journal bearing according to claim 5, wherein said stiffness and damping capacity further depend on pressure of air filling of the spaces between the bottoms of the damper pins and the dimples and/or friction force of the damper pin and sidewall of the dimple.

7. The foil journal bearing according to claim 4, wherein said stiffness and damping capacity depend on pressure of air filling of the spaces between the bottoms of the damper pins and the dimples and/or friction force of the damper pin and sidewall of the dimple.

* * * * *